United States Patent [19]

Swisher, Jr. et al.

[11] 4,171,147
[45] Oct. 16, 1979

[54] FLYWHEEL FOR A CONSTRUCTION MACHINE

[75] Inventors: George W. Swisher, Jr., Oklahoma City; Donald W. Smith, Edmond; John F. Phillips, Yukon, all of Okla.

[73] Assignee: CMI Corporation, Oklahoma City, Okla.

[21] Appl. No.: 915,071

[22] Filed: Jun. 12, 1978

[51] Int. Cl.² ............................................. E21C 47/00
[52] U.S. Cl. ..................................... 299/39; 64/27 F; 404/90; 74/574
[58] Field of Search ............... 404/90, 93, 94; 299/39; 74/574, 572; 64/27 F

[56] References Cited

U.S. PATENT DOCUMENTS

| | | | |
|---|---|---|---|
| 894,269 | 7/1908 | Hendron | 404/90 X |
| 1,325,057 | 12/1919 | Tibbetts | 74/574 |
| 1,896,914 | 2/1933 | Paton | 64/27 F X |
| 2,019,198 | 10/1935 | Spase | 64/27 F |
| 2,062,369 | 12/1936 | Meyer | 74/574 |
| 2,153,914 | 4/1939 | Christman | 74/574 |
| 2,817,275 | 12/1957 | Lenker | 299/39 |
| 2,984,091 | 5/1961 | Ludwig | 64/27 F |
| 3,007,687 | 11/1961 | Hatcher | 299/39 |
| 3,207,000 | 9/1965 | White | 74/574 |
| 3,479,906 | 11/1969 | Valus | 74/574 |
| 3,606,468 | 9/1971 | Walker | 299/39 |
| 3,895,843 | 7/1975 | Wall | 299/39 |

Primary Examiner—Nile C. Byers, Jr.
Attorney, Agent, or Firm—Dunlap, Codding & McCarthy

[57] ABSTRACT

A construction machine is provided with a flywheel having a torque limiter which permits the flywheel to slip when a rotationally driven cutting tool of the machine is halted. The torque limiter is spring loaded to eliminate the need for adjustment which might otherwise be occasioned by wear.

2 Claims, 7 Drawing Figures

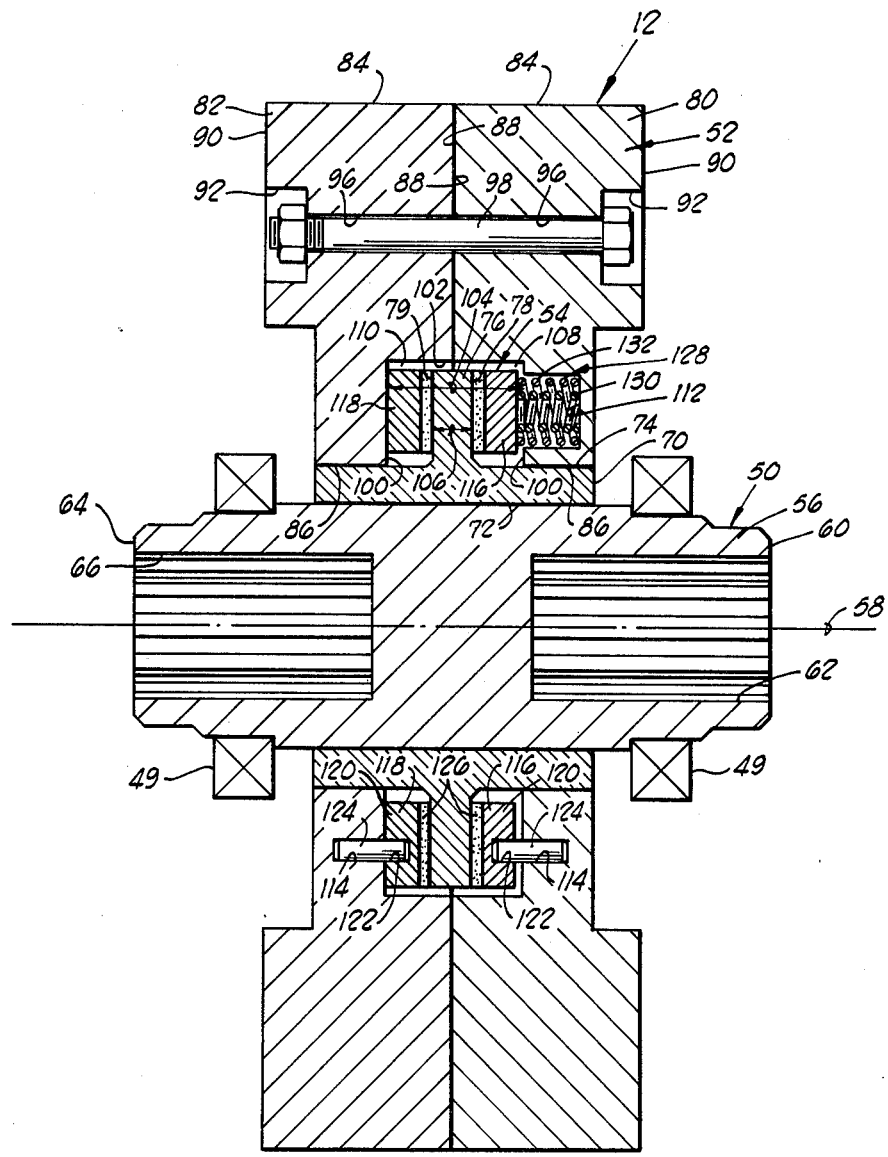

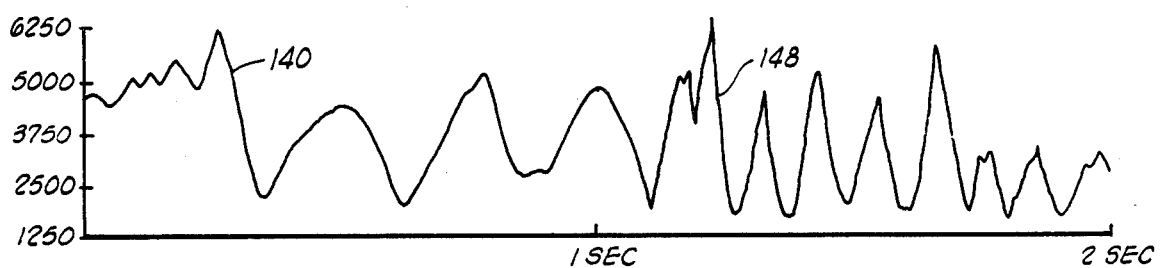
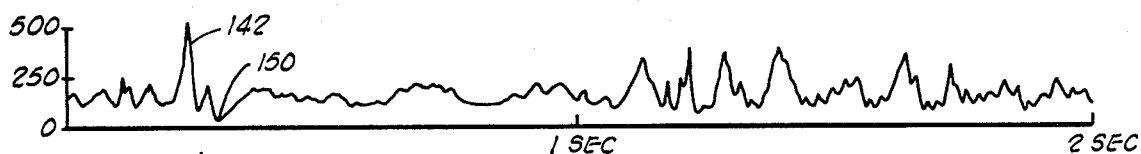
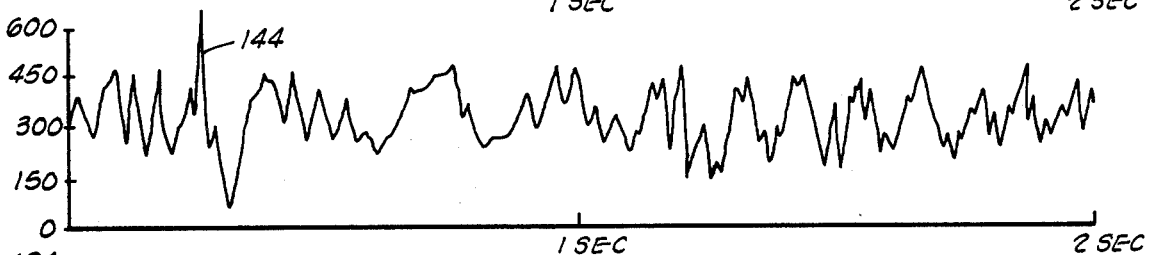
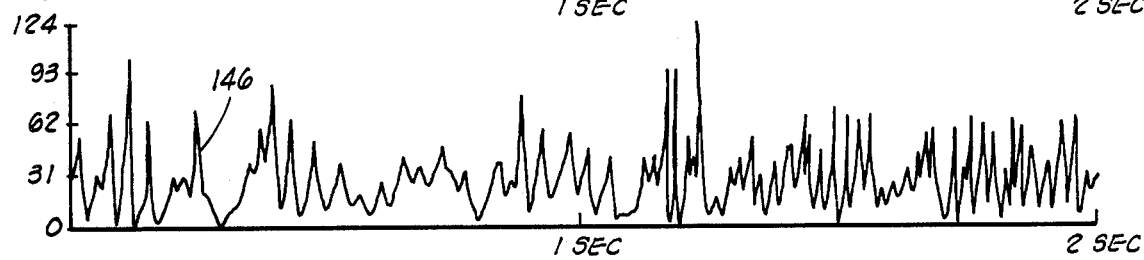
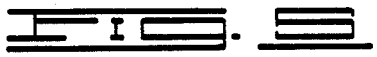
FIG. 5
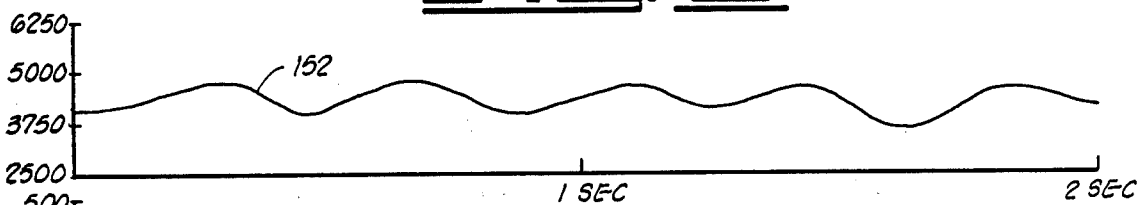
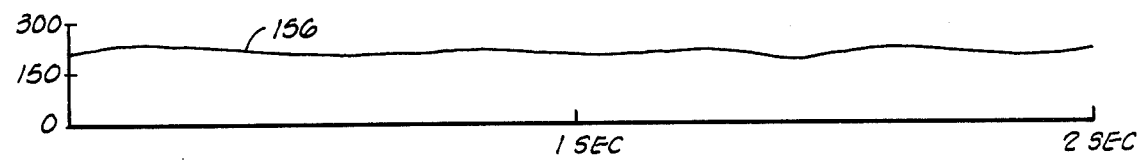
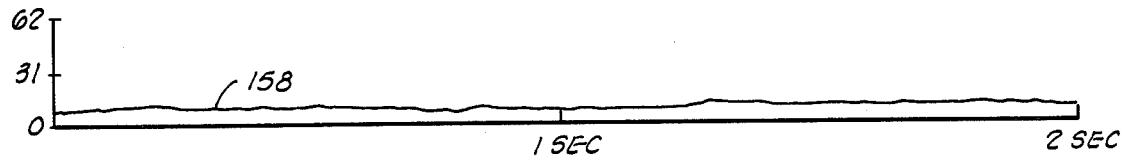
FIG. 6

FLYWHEEL FOR A CONSTRUCTION MACHINE

BACKGROUND OF THE INVENTION

1. Field of the Invention

This invention relates generally to improvements in highway construction machinery, and more particularly, but not by way of limitation, to flywheels incorporated in a cutting tool drive train of such machinery.

2. Description of the Prior Art

In the art of highway construction, various types of machines are used to cut earth and other materials for various purposes; for example, the preparation of a road bed. An example of such a machine, used to remove the upper surface of a previously paved roadway, is described in the co-pending application of Herbert Edward Jakob and Richard A. Silbernagel entitled "Method and Apparatus for Planing a Paved Roadway", Ser. No. 672,326, and assigned to the assignee of the present invention.

Machines designed to provide a cutting function often employ a rotationally driven cutting tool driven by a hydraulic motor which, in turn, is powered by pressurized hydraulic fluid provided by a hydraulic pump. For example, in the machine described in the above referenced application, the cutting tool is a drum having a plurality of cutters positioned on a spiral flight wrapped around the drum. The drum is rotated as the machine is moved along a roadway so that the cutters are driven into the roadway to remove a layer of the roadway. The hydraulic motor used to rotate the drum operates at a relative high rate of rotation and is coupled to the drum through a gear reduction box to reduce the speed with which the drum rotates. A chain drive is used to connect the gear reduction box to the drum.

A problem, which is especially acute when the cutting tool is driven by means of a hydraulic drive system incorporating a swash plate type pump, occurs with machines which carry out a cutting function. As the cutting tool is driven into a paved roadway or earth, mechanical shocks are generated in the cutting tool and fed back into the drive system. These shocks can reduce the lifetime of the drive system. The problem is especially acute when the drive system includes a swash plate type pump because such pumps utilize the pressure in the return line from a hydraulic motor driven by the pump to maintain contact between working parts of the pump. It has been found by experimentation that mechanical shocks generated in the cutting tool can reduce the return line pressure to a value insufficient to maintain the required contact. The result is an internal battering of the pump caused by successive disengagement and engagement of internal parts of the pump.

It is known that a flywheel in the drive train of a cutting tool will reduce mechanical shock fed back to the drive system of the cutting tool. A trencher incorporating a flywheel in the cutting tool drive train has been produced using a gear box having an integral flywheel and produced by Power Engineering and Manufacturing, Ltd. of 724 Sycamore Street, Waterloo, Iowa, 50703 and the use of a flywheel in a hydraulically driven conveyor in an earth scraper is disclosed in U.S. Pat. No. 3,208,165 issued Sept. 28, 1965 to C. M. Johnson and J. E. Lowder.

However, the use of a flywheel for shock reduction can introduce a second problem. If the cutting tool is suddenly stopped, the drive train transmits forces from the cutting tool to the flywheel to exert a torque on the flywheel tending to halt the flywheel in the same period of time that the cutting tool is halted. If this time is short and if the angular momentum of the flywheel is large, the magnitude of forces sufficient to exert the required torque can also be sufficient to shear teeth from gears or to break a chain in a drive train which transmits these forces. In a construction machine such as the roadway planer described in the aforementioned patent application, Ser. No. 672,326, the angular momentum of the flywheel must be large if the flywheel is to effectively isolate the drive system for the cutting tool from mechanical shock generated by driving cutting tools into a concrete or asphalt surface.

Rapid stoppages are not uncommon when the construction machine is a roadway planer such as that described in the above-referenced patent application. Such machines are used on paved roadways and it is not always possible for the operator of the machine to avoid driving the cutting tool across a manhole or the like. Moreover, such machines must have considerable weight to force cutters into a pavement so that the machine will have little tendency to climb away from the exceptional load presented by such obstacles as a manhole. Rather, it is likely that the cutting tool will be brought rapidly to a halt.

SUMMARY OF THE INVENTION

The present invention contemplates providing a construction machine, having a rotationally driven cutting tool, with a flywheel constructed to permit an energy storing inertia wheel to slip during sudden stoppages of the cutting tool. For this purpose, the flywheel is provided with a torque limiter which clamps the inertia wheel to a hub portion of the flywheel during normal operation of the machine while permitting the inertia wheel to slip on the hub of the flywheel when a preselected torque is exerted between the hub and the inertia wheel. The torque limiter is spring loaded to eliminate readjustment which might otherwise be required because of wear to the torque limiter occasioned by repeated stoppages.

An object of the invention is to provide a construction machine with the advantages provided by a flywheel coupled to the cutting tool thereof while avoiding damage that might result from a sudden stoppage of the cutting tool.

Another object of the invention is to provide a flywheel having a slippage capability while eliminating the need for periodic adjustment of the mechanism providing such capability.

Other objects and advantages of the invention will be evident from the following detail description when read in conjunction with the accompanying drawings.

BRIEF DESCRIPTION OF THE DRAWINGS

FIG. 4 is a cross-section of a flywheel taken along line 4—4 of FIG. 3.

FIG. 5 is a representative illustration of the hydraulic pressure at various positions in the drive system of a construction machine incorporating a flywheel.

FIG. 6 is a representative illustration of the hydraulic pressure at various positions in the drive system of a construction machine incorporating a flywheel.

DESCRIPTION OF THE PREFERRED EMBODIMENT

Figures 1, 2:
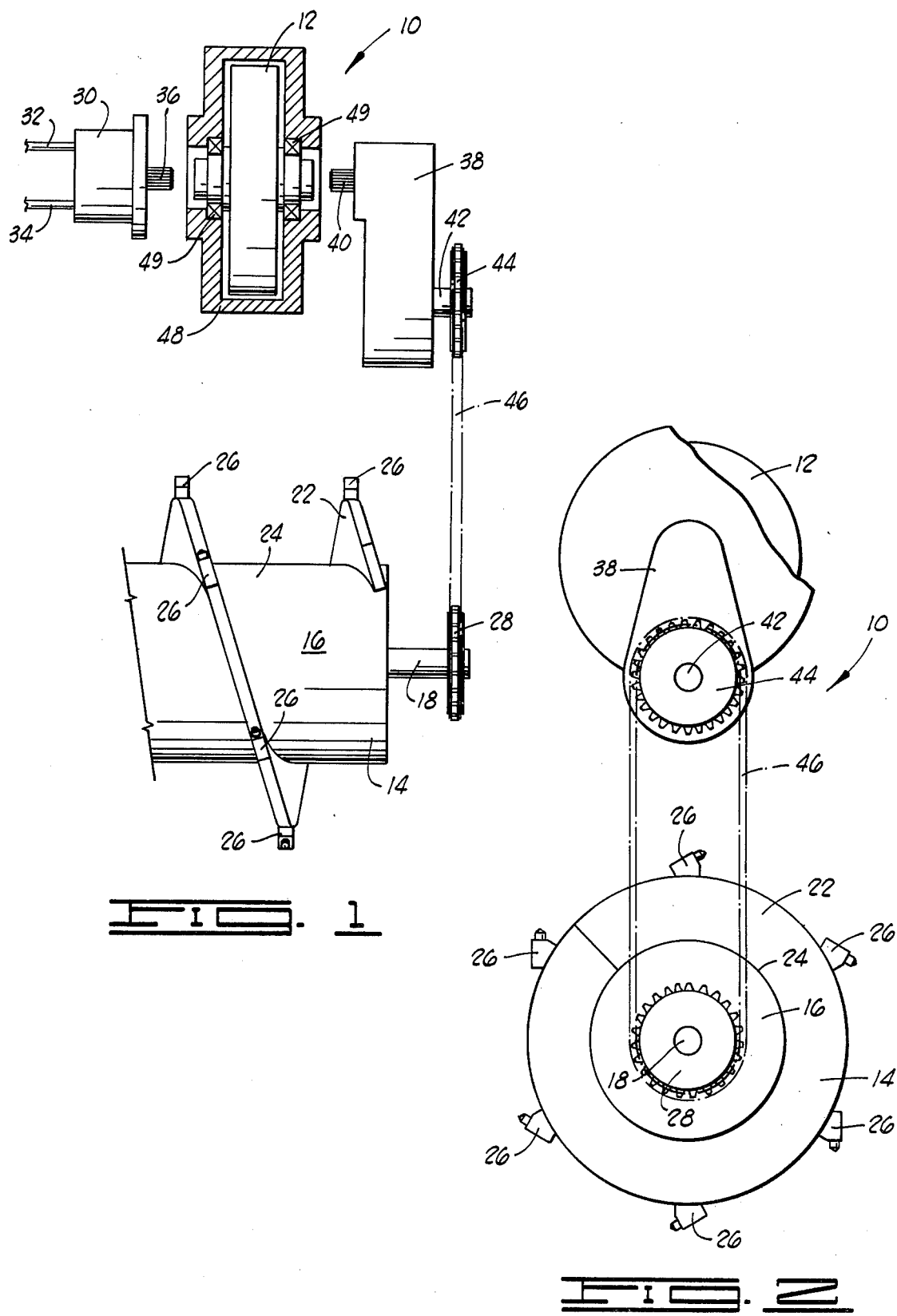
FIG. 1 is a partially exploded front elevational view of the drive train of a construction machine incorporating a flywheel constructed in accordance with the present invention.
FIG. 2 is a side elevational view of the drive train of FIG. 1.

Referring now to the diagrams and to FIGS. 1 and 2 in particular, shown therein and designated by the general reference numeral 10 is the drive train of a construction machine incorporating a flywheel 12 constructed in accordance with the present invention. The drive train 10 rotationally drives a cutting tool 14 which for purposes of illustration, but not of limitation, has been illustrated as a cutting tool used in a machine such as that described in the aforementioned patent application, Ser. No. 672,326. The cutting tool 14 comprises a drum 16 mounted on a shaft 18 which is rotatably supported on the frame (not shown) of a construction machine by suitable bearings (not shown). A spiral flight 22 is attached to the periphery 24 of the drum 16 and is provided with a plurality of cutters 26. A driven sprocket 28 is mounted on the shaft 18 for rotating the cutting tool 14.

The drive train 10 comprises a hydraulic motor 30 which is powered by pressurized hydraulic fluid supplied by a hydraulic pump (not shown) via a high pressure line 32 and a return line 34. The hydraulic motor 30 has a splined output shaft 36 which drives the flywheel 12 as will be described more fully below. (For purposes of illustration, the motor 30 has been displaced from the flywheel 12 in FIG. 1).

The drive train 10 further comprises a gear reduction box 38 having a splined input shaft 40 which is driven by the flywheel 12 as will be described more fully below. (For purposes of illustration, the gear reduction box 38 has been displaced from the flywheel 12 in FIG. 1.) The gear reduction box 38 is of conventional design and need not be described herein. The gear reduction box 38 has an output shaft 42 upon which a driving sprocket 44 is mounted. A drive chain, represented by broken line 46 in FIGS. 1 and 2, connects the driving sprocket 44 to the driven sprocket 28 for rotating the cutting tool 14.

The flywheel 12 is mounted within a case 48 via bearings 49. (For purposes of illustration, the case 48 and the bearings 49 have been drawn in cross-section in FIG. 1.) As has been noted above, the motor 30 and the gear reduction box 38 have been displaced from the flywheel 12 in FIG. 1 for purposes of illustration. In practice, the motor 30 and the gear reduction box 38 abut the case 48. The case 48 is supported by the frame (not shown) of the construction machine in any suitable manner.

Figure 3:
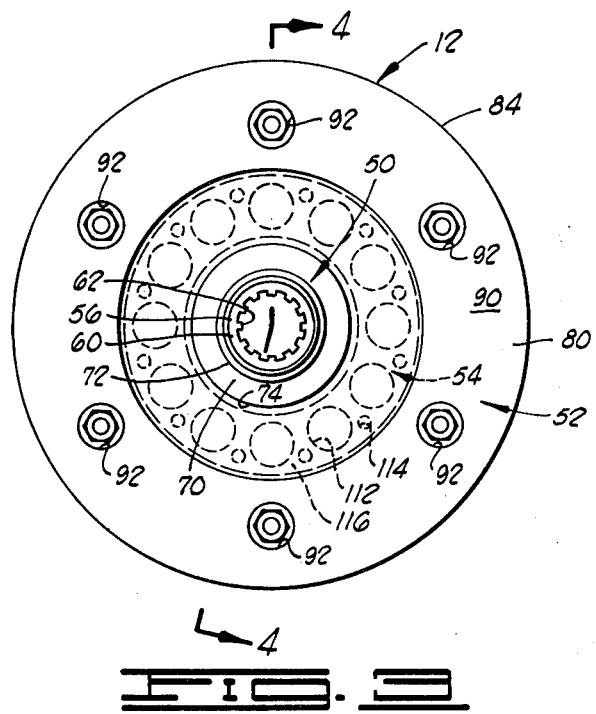
FIG. 3 is a side elevational view of a flywheel constructed in accordance with the present invention.

Referring now to FIGS. 3 and 4, illustrated therein is the construction of the flywheel 12. The flywheel 12 comprises a hub, generally designated 50, and an inertia wheel, generally designated 52, coupled via a torque limiter, generally designated 54. The torque limiter 54 is enclosed within the inertia wheel 52 and the portions of the torque limiter 54 have been indicated in dashed lines in FIG. 3.

The hub 50 comprises a shaft 56 mounted on the case 48 via the bearings 49 for rotation about a flywheel axis 58. The shaft 56 has a first end 60 and a splined first bore 62 is formed in the shaft 56, the bore first 62 intersecting the first end 60 and extending a distance into the shaft 56 concentrically with the axis 58. The shaft 56 has a second end 64 and a splined second bore 66 is formed in the shaft 56, the second bore 66 intersecting the second end 64 of the shaft 56 and extending a distance into the shaft 56 concentrically with the axis 58. When the flywheel 12 is mounted in a construction machine as illustrated in FIGS. 1 and 2, the first bore 62 accepts the splined input shaft 40 of the gear reduction box 38 and the splines on the shaft 40 engage the splines of the first bore 62 such that a rotation of the flywheel 12 is transmitted via the gear reduction box 38 to the cutting tool 14. The second bore 66 accepts the splined output shaft 36 of the motor 30 and the splines on the shaft 36 mesh with the splines in the second bore 66 such that a rotation of the shaft 36 is imparted to the flywheel 12. (As will become clear below, the flywheel 12 is not symmetric with respect to the ends thereof defined by the ends 60 and 64 of the shaft 56. The mounting of the flywheel 12 between the motor 30 and the gear reduction box 38 such that the first bore 62 accepts the shaft 40 and the second bore 66 accepts the shaft 36 is for illustration only of the manner in which the flywheel 12 is coupled to the drive train 10. It will be clear to those skilled in the art that the flywheel 12 can be disposed between the motor 30 and the gear reduction box 38 such that the first bore 62 accepts the shaft 36 and the second bore 66 accepts the shaft 40.)

The hub 50 further comprises a sleeve 70 having a bore 72 and a cylindrical peripheral surface 74. The bore 72 is sized to accept the shaft 56 and the sleeve 70 is mounted on the shaft 56 about the central portions of the shaft 56 such that the bore 72 and the cylindrical peripheral surface 74 are concentric with the flywheel axis 58. The sleeve 70 is secured to the shaft 56 by any suitable means. A flange 76 is formed on the central portion of the periphery 74 of the sleeve 70 and extends circumferentially about the hub 50. The flange 76 has a first side 78 disposed substantially perpendicularly to the axis 58 and a second side 79 similarly disposed substantially perpendicularly to the axis 58.

The inertia wheel 52 comprises a first wheel member 80 and a second wheel member 82. With one exception to be noted below, the wheel members 80 and 82 are identical in construction so that it will not be necessary for purposes of this disclosure to provide separate detailed descriptions of each of the wheel members 80 and 82. Rather, it will suffice to provide one general description applicable to both wheel members 80 and 82, to designate identical features of the wheel members 80 and 82 with identical reference numbers, and to note the one exception to the identity between the wheel members 80 and 82.

The wheel members 80 and 82 are generally annular in shape, having a circular outer periphery 84 and a central bore 86. The bore 86 is dimensioned to slidingly engage the cylindrical peripheral surface 74 of the sleeve 70 and the first and second wheel members 80 and 82 are mounted on the sleeve 70 in the assembled flywheel 12 such that the inertia wheel 52 is disposed concentrically about the axis 58. The wheel members 80 and 82 have an interior face 88 and exterior face 90 and the faces 88 and 90 are disposed substantially perpendicularly to the axis 58 in the assembled flywheel 12. A plurality of bolt wells 92 are formed in the exterior faces 90 of the wheel members 80 and 82 near the outer periphery 84 and a hole 96 extends from each bolt well 92 through the wheel members 80 and 82 and intersects the interior face 88. In the assembled flywheel 12, the interior face 88 of the first wheel member 80 abuts the interior face 88 of the second wheel member 82 and the wheel members 80 and 82 are oriented about the axis 58 such that the holes 96 in the first wheel member 80 are aligned with the holes 96 in the second wheel member 82. The second wheel member 82 is fastened to the first wheel member 80 via bolts 98 which pass through the holes 96 in the wheel members 80 and 82.

Shoulders 100 are formed in the interior faces 88 of the wheel members 80 and 82 adjacent the bores 86. The shoulders 100 intersect the bores 86 and extend circumferentially about the axis 58 of the assembled flywheel 12. The shoulders 100 coact to form an internal, circumferentially extending groove 102 within the inertia wheel 52, the groove 102 being formed concentrically about the axis 58 and containing the flange 76 of hub 50 in the assembled flywheel 12. The groove 102 is formed such that the width 104 of groove 102 exceeds the thickness 106 of the flange 76 and the inertia wheel 52 is positioned on the hub 50 such that the flange 76 and the shoulders 100 form a first brake shoe chamber 108 adjacent the first side 78 of the flange 76 and a second brake shoe chamber 110 adjacent the second side 79 of the flange 76. The brake shoe chambers 108, 110 extend circumferentially about the axis 58 in the assembled flywheel 12.

A plurality of spring wells 112 are formed in the shoulder 100 of the first wheel member 80, and the spring wells 112 extend a distance into the wheel member 80 in a direction generally parallel to the axis 58 of the assembled flywheel 12 as indicated in FIG. 4. The second wheel member 82 differs from the first wheel member 80 only in that no spring wells 112 are formed in the second wheel member 82.

A plurality of alignment bores 114 are formed in the shoulders 100 of the wheel members 80, 82 and the alignment bores 114 extend a distance into the wheel members 80, 82 in a direction generally parallel to the axis 58 of the assembled flywheel 12. In one preferred embodiment of the flywheel 12, twelve alignment bores 114 are formed in the shoulders 100 of each of the wheel members 80, 82 and the alignment bores 114 are symmetrically disposed about the flywheel axis 58 as has been indicated in dashed lines in FIG. 3. As has further been indicated in FIG. 3, the alignment bores 114 in the first wheel member 80 are symmetically positioned between the spring wells 112 formed therein.

The torque limiter 54 comprises a first shoe 116 contained within the first brake shoe chamber 108 and a second shoe 118 contained within the second brake shoe chamber 110. The shoes 116 and 118 are identical in construction so that it will not be necessary for purposes of this disclosure to provide separate detailed descriptions of each of the shoes 116, 118. Rather, it will suffice to provide one description applicable to both shoes 116, 118 and to designate identical features of the shoes 116, 118 with identical reference numerals.

The shoes 116, 118 generally have the form of rings as has been indicated in dashed lines in FIG. 3 for the first shoe 116 and the shoes 116 and 118 are disposed concentrically about the axis 58 in the assembled flywheel 12.

Each shoe 116, 118 comprises a back-up ring 120 having a plurality of alignment bores 122 formed therein and the alignment bores 122 are positioned on the back-up rings 120 such that each alignment bore 122 is coaxial with an alignment bore 114 in the wheel members 80, 82 when the flywheel 12 is assembled. Alignment pins 124 are disposed within the alignment bores 114 of the wheel members 80, 82 and the alignment pins 124 extend from the shoulders 100 of the wheel members 80, 82 to engage the alignment bores 122 for fixing the shoes 116 and 118 against angular rotation with respect to the wheel members 80 and 82.

Each shoe 116, 118 further comprises a brake lining 126 mounted on the back-up ring 120 adjacent the flange 76 of the hub 50. The torque limiter 54 comprises a plurality of spring assemblies 128, each spring assembly 128 being disposed within a spring well 112 for urging the first shoe 116 against the first side 78 of the flange 76 of the hub 50. The forces exerted by the spring assemblies 128 urge the flange 76 against the second shoe 118 such that the second shoe 118 is forced against the shoulder 100 formed in the interior face 88 of the second wheel member 82. Accordingly, the flange 76 is clamped between the brake linings 126 of the shoes 116, 118 and the shoes 116, 118 exert substantially equal forces on the sides 78, 79 of the flange 76. In a preferred embodiment of the flywheel 12, each spring assembly comprises a first coil spring 130 disposed within a larger second coil spring 132.

The forces which the shoes 116, 118 exert against the flange 76 are adjusted by selecting the lengths and spring constants of springs 130 and 132. As will be clear from the foregoing description, urging the shoes 116 and 118 against the flange 76 will result in frictional forces between the shoes 116 and 118 and the flange 76. Since the shoes 116 and 118 are fixed against angular rotation relative to the inertia wheel 52 by the alignment pins 124, the frictional forces between the shoes 116 and 118 and the flange 76 will support a moderate torque between the hub 50 and the inertia wheel 52. However, when the torque between the hub 50 and the inertia wheel 52 attains a value preselected by the force the shoes 116, 118 exert on the flange 76, the frictional forces exerted between the shoes 116, 118 and the flange 76 will be insufficient to fix the inertia wheel 52 against angular rotation on the hub 50. Accordingly, the forces which the shoes 116, 118 exert on the flange 76 establish a preselected break away torque which may exist between the inertia wheel 52 and the hub 50. By way of example, but not of limitation, it is been found that twelve first coil springs 130 and twelve second coil springs 132 disposed within the spring wells 112 of the first wheel member 80 will provide a suitable break away torque between the inertia wheel 52 and the hub 50 in the normal operation of a roadway planer such as that described in the aforementioned patent application, Ser. No. 672,326, where the force exerted by each first spring 130 is approximately 390 newtons and where the force exerted by each second spring 132 is approximately 880 newtons. The cutting tool 14 to which the above values apply has a moment of inertia of approximately 14 kg-m$^2$ and is driven at a rate of approximately 110 revolutions per minute. The flywheel 12 for which the above values apply has a moment of inertia about the axis 58 of approximately 0.56 kg-m$^2$ and rotates at a rate of approximately 2700 revolutions per minute.

OPERATION OF THE PREFERRED EMBODIMENT

FIGS. 5 and 6 have been included to illustrate the effect of the feedback of mechanical shock to the drive system of a roadway planer such as that described in the aforementioned patent application Ser. No. 672,326 and the further effect of introducing a flywheel, such as the flywheel 12, into the drive train of the cutting tool. In FIG. 5, the curve designated 140 is substantially the pressure within the high pressure line 32 between the pump (not shown) and hydraulic motor 30 of the roadway planer drive system during a portion of a test period in which such pressure was measured by a pressure transducer connected to a recording instrument. (The curve 140 is a representative curve; for example, high frequency pressure variations have been eliminated in drawing curve 140 from a recorded curve and some smoothing of the recorded curve has been unavoidable in drawing curve 140. Thus, the curve 140 illustrates only the general features of the recorded curve.) The curves designated 142, 144 and 146 are the pressures in the return line 34, the outlet of a charge pump connected to and feeding the return line 34 and the case of the pump used to drive motor 30, respectively, for the test period during which curve 140 obtained. (As in the case of curve 140, curves 142, 144 and 146 are representative curves.) The features of these pressure variations which are especially deleterious to the cutting tool drive systems of construction machines are rapid variations in the high pressure line 32 such as that illustrated at 148 on curve 140 and very low pressures in the return line 34 as illustrated at 150 on curve 142.

FIG. 6 illustrates the effect of a flywheel on the pressures described above in conjunction with FIG. 5. In particular, the curve designated 152 is the pressure in the high pressure line 32; the curve designated 154 is the pressure in the return line 34; the curve designated 156 is the pressure in the outlet of the charge pump; and the curve designated 158 is the pressure in the case of the pump used to drive motor 30 during a portion of a test period of planer equipped with a flywheel such as the flywheel 12. (As in FIG. 5, the curves 152, 154, 156 and 158 in FIG. 6 are representative curves. Pressures shown in FIGS. 5 and 6 are in pounds per square inch.)

During normal operation of a construction machine incorporating a cutting tool drive train such as the drive train 10 the hydraulic motor 30 rotates the hub 50 of the flywheel 12 via the coupling therebetween provided by the splines on the output shaft 36 of the motor 30 and within the bore 66 formed within the second end 64 of the hub 50. Similarly, the hub 50 rotates the input shaft 40 of the gear reduction box 38.

The springs 130, 132 urge the shoes 116 and 118 of the torque limiter 54 against the flange 76 of the hub 50 with a force sufficient to prevent relative rotation of the shoes 116 and 118 and the inertia wheel 52 with the hub 50 during normal operation so that the flywheel 12 rotates as a single unit. As cutters 26 are driven into a paved roadway or the like, a non-constant power demand is placed on the drive train 10 to provide the force necessary to cause penetration of the roadway or the like by each of the cutters 26. In the absence of the flywheel, such non-constant demand would result in the above described deleterious pressure variations in the drive system for the cutting tool 14. In a construction machine constructed in accordance with the present invention, a portion of the power demand resulting from the penetration of the roadway or the like by each cutter 26 is provided by the flywheel 12 so that the mechanical shock generated by such penetration is isolated from the construction machine cutting tool drive system.

When the cutting tool 14 encounters an exceptional load as, for example, when the cutting tool 14 of a roadway planer is driven against a manhole, the cutting tool 14 is brought to a rapid halt. Since the hub 50 of the flywheel 12 is connected to the cutting tool 14 via the gear reduction box 38, the sprockets 28 and 44 and the chain 46, the hub 50 must also be brought to a rapid halt if no damage is to occur to the drive train 10. However, should the inertia wheel 52 be rigidly attached to the hub 50, stoppage of the hub 50 would require stoppage of the inertia wheel 52 so that a torque sufficient to reduce the angular momentum of the inertia wheel 52 to zero would have to be exerted on the hub 50 during the time in which the cutting tool 14 is halted. Since the rate of change of angular momentum is equal to the applied torque, the torque required to halt the inertia wheel 52 during the short time in which the cutting tool 14 is brought to rest in a sudden stoppage would be large. Moreover this torque is provided by the load encountered by the cutting tool 14 and is transmitted to the flywheel 12 via the drive train 10. As a result, large forces would be transmitted to the flywheel 12 by the drive train 10. Should the stoppage occur in a sufficiently short time, the required torque would be large enough that the forces transmitted via the drive train would become equal to the breaking strength of portions of the drive train 10. Under such condition, breakage of such portions would occur.

A different result occurs when the flywheel 12 is constructed in accordance with the present invention. Since the inertia wheel 52 is coupled to the hub 50 via frictional forces between the shoes 116, 118 of the torque limiter 54 and the flange 76 of the hub 50, the maximum torque that can be exerted between the inertia wheel 52 and the hub 50 is limited by such frictional forces. Thus, when the torque required to bring the inertia wheel 52 to a halt is greater than the torque which may be transmitted via the torque limiter 54, the inertia wheel 52 will slip on the hub 50 so that the hub 50 will be halted by a torque which is insufficient to halt the inertia wheel 52. Accordingly, the maximum torque the load encountered by the cutting tool 14 can transmit to the hub 50 via the drive train 10 is limited by the breakaway torque between the hub 50 and the inertia wheel 52. As a result, the magnitude of forces transmitted by the drive train 10 to halt the hub 50 when the cutting tool 14 experiences a sudden stoppage are limited to values insufficient to cause damage to the drive train 10.

It will be clear to those skilled in the art, that each time the cutting tool 14 is brought to a halt to cause the inertia wheel 52 to slip on the hub 50, wear will occur on the flange 76 and on the linings 126 of the shoes 116 and 118. The depths of the spring wells 112 are selected such that the wear resulting from numerous stoppages of the cutting tool 14 will be small with respect to the compressed lengths of the springs 130 and 132 in the assembled flywheel 12. Accordingly, the force with which the shoes 116, 118 are urged against the flange 76 will remain substantially constant over extended periods of time despite numerous stoppages of the cutting tool 14 so that readjustment of the torque limiter 54 is eliminated during a time period substantially equal to the lifetime of the construction machine.

DESCRIPTION OF FIG. 7

Figure 7:
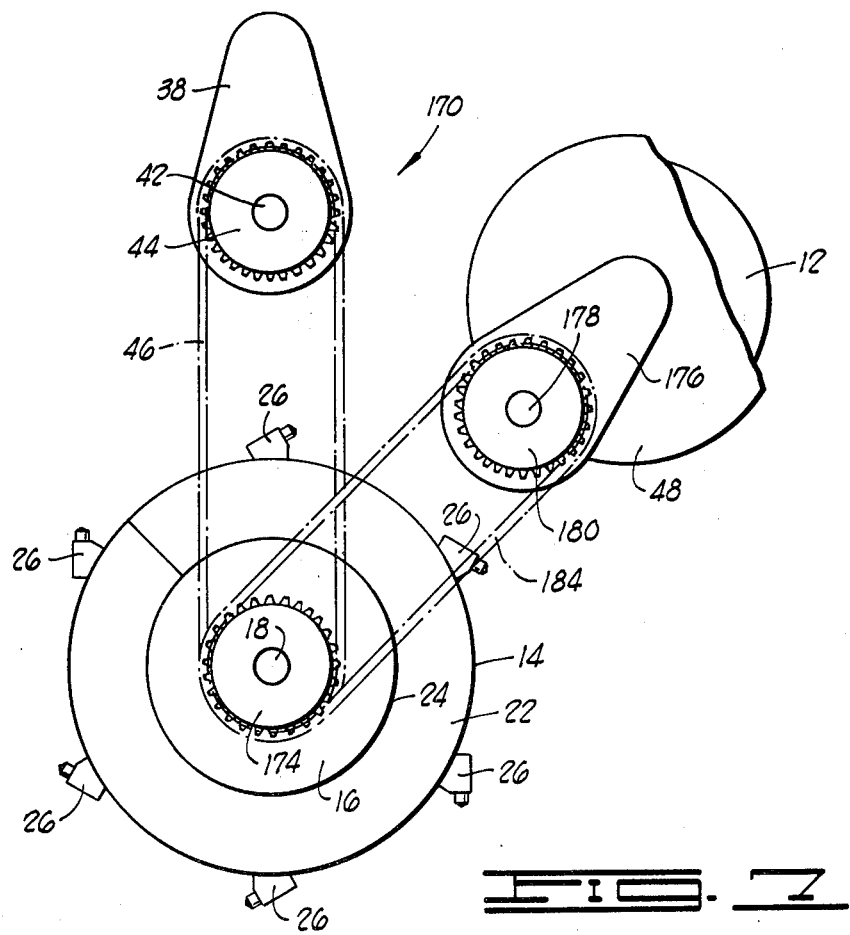
FIG. 7 is a side elevation view of an alternative drive train for a construction machine incorporating a flywheel constructed in accordance with the present invention.

FIG. 7 illustrates a second embodiment of a construction machine drive train, designated by the general reference numeral 170, which incorporates a flywheel 12 constructed in accordance with the present invention. In the drive train 170, the motor 30 (not shown in FIG. 7) is connected directly to the input shaft 40 (not shown in FIG. 7) of the gear reduction box 38; that is, the drive train 170 differs from the drive train 10 in that the flywheel 12 is not interposed between the motor 30 and the gear reduction box 38 in the drive train 170 as is the case with the drive train 10.

The drive train 170 includes a cutting tool sprocket 174 which is mounted on the shaft 18 of the cutting tool 14 for coupling the flywheel 12 to the cutting tool 14. (The driven sprocket 28, also mounted on shaft 18, has not been illustrated in FIG. 7.) The drive train 170 further comprises a flywheel gear box 176 which is mounted on the case 48 enclosing the flywheel 12. The case 48 is secured to the frame (not shown) of the construction machine. The flywheel gear box 176 is identical to the gear reduction box 38 and the flywheel gear box 176 is connected to the flywheel 12 in the same manner that the gear reduction box 38 is connected the flywheel 12 in the drive train 10. The flywheel gear box 176 has an output shaft 178 and a flywheel sprocket 180 is mounted on shaft 178. A chain, represented by the broken line designated 184 in FIG. 7, is connected between the cutting tool sprocket 174 and the flywheel sprocket 180 and couples the flywheel 12 to the cutting tool 14 in the same manner that a chain couples the gear reduction box 38 to the cutting tool 14. The operation of the flywheel 12 in the drive train 170 is identical to the operation of the flywheel 12 in the drive train 10.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the appended claims.

What is claimed is:

1. In a construction machine having a rotationally driven cutting tool, a drive train coupled to the cutting tool for rotating the cutting tool, and a flywheel coupled to the cutting tool for rotation about a flywheel axis upon rotation of the cutting tool, wherein the drive train is characterized as including a hydraulic motor, having an output shaft, and a gear reduction box, having an input shaft and wherein the cutting tool is connected to the gear reduction box for rotation in response to a rotation of the input shaft of the gear reduction box, the improvement wherein the flywheel comprises:

a hub coupled to the cutting tool;

an inertia wheel mounted on the hub for relative rotation of the inertia wheel about the hub; and torque limiting means for clamping the inertia wheel to the hub when a torque exerted between the inertia wheel and the hub is less than a preselected value and for permitting the inertia wheel to slip on the hub when a torque exerted between the inertia wheel and the hub attains the preselected value; and wherein the output shaft of the motor is connected to the input shaft of the gear reduction box via the hub of the flywheel, whereby the flywheel is coupled to the cutting tool via the gear reduction box.

2. In a construction machine having a rotationally driven cutting tool, a drive train coupled to the cutting tool for rotating the cutting tool, and a flywheel coupled to the cutting tool for rotation about a flywheel axis upon rotation of the cutting tool, wherein the drive train is characterized as comprising a hydraulic motor and means for coupling the hydraulic motor to the cutting tool, the improvement wherein the flywheel comprises:

a hub coupled to the cutting tool;

an inertia wheel mounted on the hub for relative rotation of the inertia wheel about the hub; and torque limiting means for clamping the inertia wheel to the hub when a torque exerted between the inertia wheel and the hub is less than a preselected value and for permitting the inertia wheel to slip on the hub when a torque exerted between the inertia wheel and the hub attains the preselected value;

wherein the machine further comprises means, independent of the means for coupling the hydraulic motor to the cutting tool, for coupling the flywheel to the cutting tool; and wherein the means for coupling the flywheel to the cutting tool comprises:

a flywheel gear box having an output shaft, the flywheel gear box connected to the flywheel for rotation of the flywheel in response to a rotation of the output shaft of the flywheel gear box;

a flywheel sprocket mounted on the output shaft of the flywheel gear box;

a cutting tool sprocket mounted on the cutting tool for rotation with the cutting tool; and a chain connecting the flywheel sprocket to the cutting tool sprocket.

* * * * *